United States Patent [19]

Pflanz

[11] Patent Number: 4,920,446

[45] Date of Patent: Apr. 24, 1990

[54] PYROTECHNICALLY-ASSISTED CURRENT INTERRUPTER

[75] Inventor: Herbert M. Pflanz, Westwood, Mass.

[73] Assignee: G & W Electric Co., Blue Island, Ill.

[21] Appl. No.: 252,014

[22] Filed: Sep. 27, 1988

Related U.S. Application Data

[63] Continuation of Ser. No. 853,695, Apr. 18, 1986, abandoned.

[51] Int. Cl.[5] .................... H02H 3/00; H01H 37/76

[52] U.S. Cl. .................... 361/93; 361/125; 337/30

[58] Field of Search .................... 361/93, 99, 125, 102–104, 361/125, 58; 337/4, 30, 40, 243, 158–162

[56] References Cited

U.S. PATENT DOCUMENTS

| | | | |
|---|---|---|---|
| 2,158,859 | 5/1939 | Horikoshi | 361/125 |
| 2,263,752 | 11/1941 | Babler | 361/125 X |
| 2,305,436 | 12/1942 | McMorris | 337/30 |
| 2,551,858 | 5/1951 | Stoelting et al. | 361/125 X |
| 2,892,062 | 6/1959 | Bruckner et al. | 200/135 |
| 2,961,593 | 11/1960 | Kozacka | 361/99 X |
| 3,111,606 | 11/1963 | Schultz et al. | 361/125 |
| 3,340,430 | 9/1967 | Jenkins | 361/104 |
| 3,668,458 | 6/1972 | Irie et al. | 361/125 X |
| 3,679,938 | 7/1972 | Carothers | 361/125 |
| 3,700,970 | 10/1972 | Miyoshi . | |
| 3,705,373 | 12/1972 | Cameron | 337/160 |
| 3,958,206 | 5/1976 | Klint | 337/406 |
| 4,019,097 | 4/1977 | Miller et al. | 361/93 |
| 4,176,385 | 11/1979 | Dethlefsen | 361/58 |
| 4,204,238 | 5/1980 | Stetson | 361/125 |
| 4,275,431 | 5/1981 | Swoish et al. | 361/93 |
| 4,342,978 | 8/1982 | Meister | 337/158 X |
| 4,439,803 | 3/1984 | Baba | 361/104 X |
| 4,471,402 | 9/1984 | Cunningham | 361/125 |
| 4,479,105 | 10/1984 | Banes | 337/401 X |
| 4,503,414 | 3/1985 | Sykes et al. | 361/125 X |

FOREIGN PATENT DOCUMENTS

| | | |
|---|---|---|
| 0121982 | 10/1984 | European Pat. Off. . |
| 2907615 | 9/1979 | Fed. Rep. of Germany . |
| 2123227 | 1/1971 | France . |

*Primary Examiner*—William M. Shoop, Jr.
*Assistant Examiner*—A. Jonathan Wysocki
*Attorney, Agent, or Firm*—Fitch, Even, Tabin & Flannery

[57] ABSTRACT

A current interrupter wherein current is normally carried by a bus bar, and a portion of the bus bar is segmented by a pyrotechnic charge under excess current conditions. The charge is detonated by a detonator which is triggered by voltage across a resistive element in series with the bus bar. At the time the detonator is triggered, the resistive element provides sufficient resistance to trigger the detonator while operating at a temperature below its melting point. A control device may be employed to control current flow through the detonator.

7 Claims, 3 Drawing Sheets

PYROTECHNICALLY-ASSISTED CURRENT INTERRUPTER

This application is a continuation of application Ser. No. 853,695, filed Apr. 18, 1986, now abandoned.

BACKGROUND OF THE INVENTION

This invention relates to apparatus for automatically interrupting current in an electrical circuit under overload conditions, and more particularly to current interrupters for use in relatively high current applications.

The current in electrical circuits must be interrupted automatically under overload or fault conditions, especially those caused by short circuits and the like, to prevent possible damage to the circuit components. In relatively high power equipment, such as power distribution and transmission apparatus used by utilities, the current must be limited in magnitude and interrupted very rapidly when an overload condition occurs, preferably within one quarter of a cycle, before the current reaches even one, amplitude peak.

Current limiting devices have been developed which are capable of limiting the current in about 200 microseconds, and interrupting it in less than one quarter of a cycle. Such devices generally include a fusible element which is placed in sand or the like. The fusible element includes one or more portions of reduced cross-section. An overload current melts the element at the portions of reduced cross-section, creating arcs. The sand absorbs enough energy from the arcs to extinguish them, and the current is interrupted. Such high voltage fuses have a relatively low continuous current carrying capability of about 200 amperes.

In one known type of current limiting interrupter with higher continuous current carrying capability, a large cross-section conductor or bus bar carries the current under normal operating conditions. When a fault such as a short circuit occurs, a linear pyrotechnic charge breaks the conductor into segments. In relatively low voltage applications, the sum of the arc voltage drops across the gaps thus created is sufficient to interrupt the current. In high voltage applications, the sum of these arc voltages would be too small to effect current limited interruption. Therefore, the current is commutated to a parallel current limiting fuse and the element of the current limiting fuse melts and causes current limited interruption in a conventional manner.

While current interrupters of the type described above have proven effective, they have been relatively expensive. A substantial portion of the cost of commercially available current interrupters of the above-described type is attributable to electronic equipment which is used to sense excessive current and ignite the explosive charge. This equipment may include isolation transformers, a current sensing transformer, and solid-state triggering logic. An external line voltage power source is generally needed for this equipment which further adds to the cost of the system and its installation. There is a need for a less expensive triggering system for sensing excessive current and detonating the pyrotechnic charge in pyrotechnic current interrupters. There is also a need for a triggering system which does not require external power sources or external connections. Past attempts to address these needs are disclosed in U.S. Pat. Nos. 4,538,133 and 4,479,105.

A general object of this invention is to provide new and improved apparatus for interrupting current in an electrical circuit.

A more specific object is to provide new and improved means for igniting a pyrotechnic charge in a current interrupter in response to excessive current flow.

SUMMARY OF THE INVENTION

The invention is embodied in a current interrupter in which a pyrotechnic charge segments a bus bar. An overload detection device which provides a voltage drop that increases with increased current flow therethrough is connected in series with the bus bar, and the pyrotechnic charge is detonated by a low energy detonator which is connected in parallel with the overload detection device. During normal current conditions the voltage across the overload detection device and detonator is insufficient to trigger the detonator, but when excessively high current flows through the interrupter, the voltage increases sufficiently to trigger the detonator.

In accordance with one feature of the invention, the overload detection device may comprise a resistive element such as a strip of metal which has resistance characteristics related to the trigger level of the detonator such that the detonator is triggered while the strip of metal is operating at a temperature below its melting point. In accordance with another feature of the invention, control means may be provided to control current flow through the detonator and enable various trigger levels to be available for an interrupter having a particular overload detection device and detonator.

DETAILED DESCRIPTION OF PREFERRED EMBODIMENTS

Figure 4:
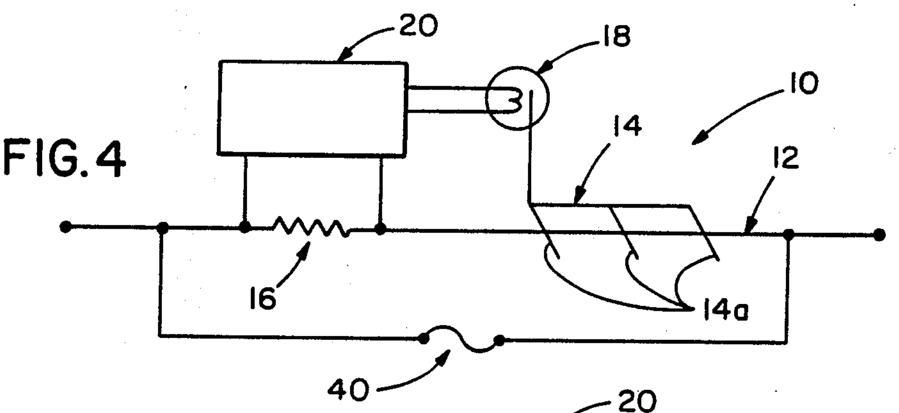
FIG. 4 is a schematic diagram illustrating apparatus of FIG. 1 in combination with control means and a parallel current limiting fuse.

The invention is generally embodied in a pyrotechnic current interrupter 10 which employs a bus bar 12 to conduct current under normal conditions, and employs a linear pyrotechnic cutting charge 14 to sever the bus bar 12 at spaced locations when excessively high current flows through the bus bar. A current limiting fuse 40 may be connected in parallel to bus bar 12, as illustrated in FIG. 4. To sense excessively high current and detonate the charge in response thereto, overload detection means such as the illustrated resistive means 16 are connected in series with the bus bar 12, and a detonator 18 is connected in parallel with the resistive means 16. During normal current conditions the voltage drop across the resistive means 16 and detonator 18 is insufficient to trigger the detonator, but when excessively high current flows through the interrupter 10 the voltage drop increases sufficiently to trigger the detonator 18.

The detonator 18 has a predetermined trigger level which may be expressed as the quantity of energy input required to effect detonation. For purposes of the present analysis, this energy input is dependent upon the integral of the square of the current over time. Similarly, the interrupter 10 has a trigger level which is determined by the trigger level of the detonator 18 and the relationship between current flow through the detonator 18 and current flow through the bus bar 12.

In accordance with one feature of the invention, the electrical resistance of the detonator 18 is related to that of the resistive means 16 such that when fault current begins to flow through the interrupter 10, the current level through the detonator 18 reaches a sufficient level for a sufficient time to trigger the detonator while the temperature of the resistive means is below its melting point. In accordance with a second feature of the invention, control means 20 (FIGS. 4–10) may be provided to vary the trigger level of the interrupter 10.

The bus bar 12 has a series of portions of reduced cross-section 22 formed therein to facilitate formation of gaps by the pyrotechnic charge. The pyrotechnic charge 14 in the illustrated embodiment is a cord such as Primacord, and is arranged so as to have a respectives portions 14*a* extending transversely across the bus bar beneath each of the portions of reduced cross-section in the bus bar. Upon detonation, the portions of reduced cross-section 22 are cut and folded upward.

The bus bar 12 is partially enclosed by a generally cylindrical housing 24. The ends 26 of the bus bar 12 protrude from the housing 24. The housing 24 includes a generally cylindrical side wall 28 and a pair of divider walls 32*a* and 32*b* which separate the interior of the housing into a central compartment 34 which contains the pyrotechnic charge 14 and detonator 18, a first end compartment 36 which contains the resistive element 16, and a second end compartment 38. The central compartment 34 may be filled with air or with a dielectric gas.

The first end compartment 36 is filled by two plugs 30*a* and 30*b*, and a layer of sand 31 which is disposed therebetween. The plugs 30*a*, 30*b* are preferably made of a resin reinforced by glass fibers, and are preferably formed in the compartment 36 so as to conform to the shapes of the bolts, bus bar, etc.

To fill the compartment 36, the interrupter is placed on end so that the compartment 36 is uppermost, and a sealant is applied to the periphery of the transverse wall 32*a*. Glass fibers and resin are poured into the compartment 36 up to a level just beneath the resistive element 16 to form the first plug 30*a*, then the layer of sand 31 is added, followed by a second layer of glass fibers and resin to form the second plug 30*b*. The compartment 38 at the opposite end is similarly filled, but with a single plug 33.

The bus bar 12 has a transverse gap 42 formed therein and the resistive means 16 preferably comprises one or more thin strips of silver which extend longitudinally of the bus bar 12 across the gap 42. The number of silver strips employed is determined by the current rating of the interrupter. To enable the interrupter to carry a continuous 200 ampere A.C. current, one silver strip is used. To enable the interrupter to carry higher continuous current one additional silver strip is employed for each additional 200 amperes.

Figures 1, 2, 3:
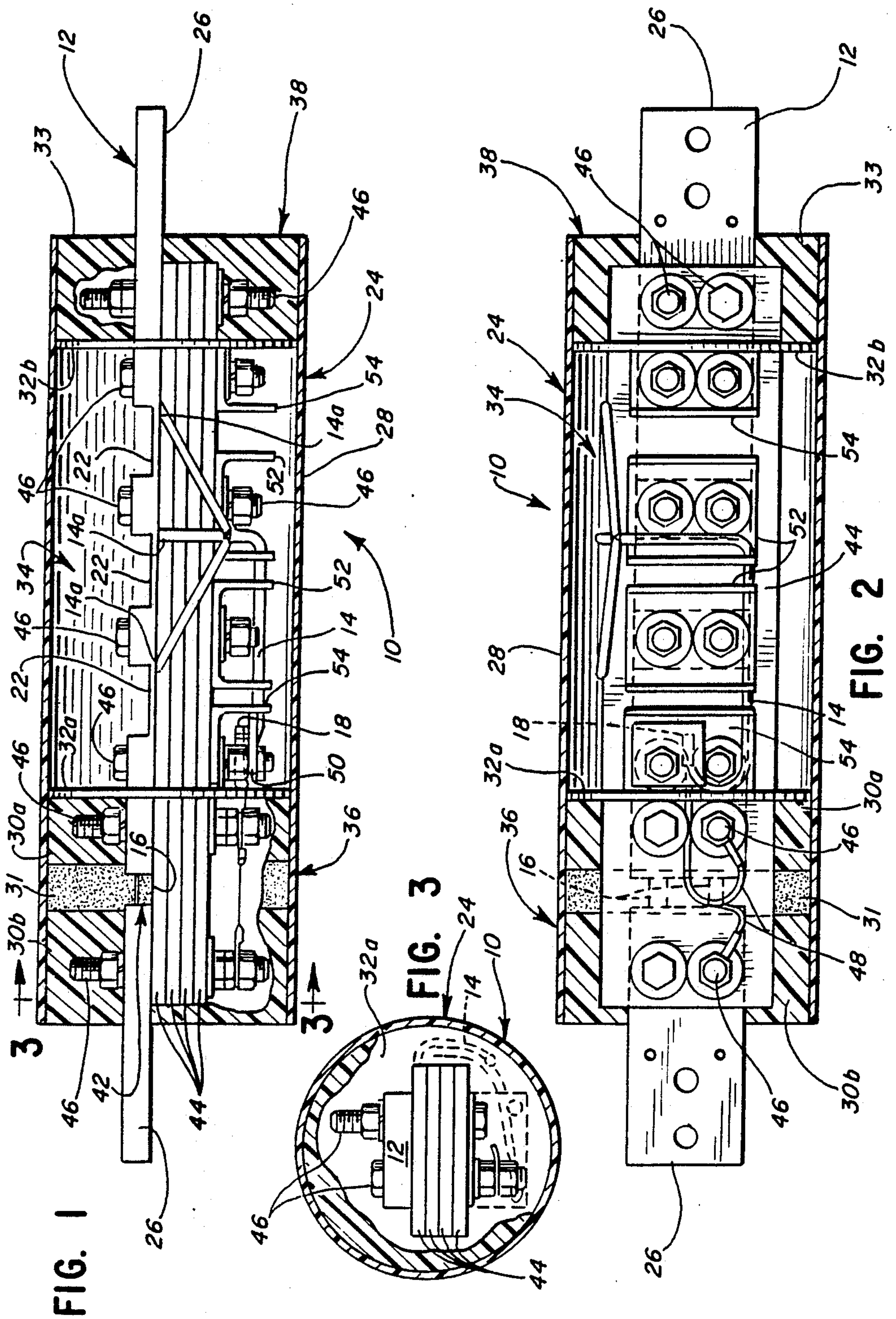
FIG. 1 is a side elevational view, taken partially in section with portions broken away, of apparatus in accordance with a preferred embodiment of the invention.
FIG. 2 is a bottom view, taken partially in section with portions broken away, of the apparatus of FIG. 1.
FIG. 3 is a sectional view taken along line 3—3 in FIG. 1, shown with portions broken away.

The resistance of the resistive means 16 is a function of (1) the total cross-sectional area of the strip or strips, (2) the width of the gap 42—i.e., the effective length of the strip or strips—and (3) the resistivity of the strip or strips, which is a function of temperature. In the embodiment of FIGS. 1–3, each of the silver strips of the invention has a width of about 0.275 in. and a thickness of about 0.004 in. which provides a cross-sectional area of about 0.0011 $in.^2$, or 0.0071 $cm.^2$. The width of the gap 42 in the bus bar is 0.5 in., or 1.27 cm. When the interrupter operates at its rated amperage, the strips operate at or near 50° to 100° C. Each silver strip is soldered at both ends to the bus bar 12 and is immersed in sand 31.

The preferred detonator 18 is a low-energy, fast-acting device comprising an electrically conductive bridgewire which contacts a primary explosive. Detonation is effected by transfer of heat produced by the current through the bridgewire to the primary explosive. The preferred detonator has a resistance of about 2–5 ohms, several orders of magnitude above that of the resistive means 16.

The bus bar 12 is fastened to a stack of generally rectangular insulating plates 44 by a plurality of vertically extending bolts 46. The detonator 18 is connected in parallel with the resistive means by fastening its leads 48 to a pair of the bolts which contact the bus bar 12 on opposite sides of the gap 42 in end compartment 36.

The detonator 18 is supported on a bracket 50 which is mounted on one of the bolts 46. The leads 48 extend through the divider wall 32*a* to the adjacent compartment 36. To prevent flow of current between the portions of the bolts 46 which extend beneath the plates 44 after detonation of the charge 14, transversely oriented channel members 52 and angle members 54 are bolted to the bottom of the stack of plates 44 so as to provide transversely-extending vertical walls between the bolts 46 that will be on opposite sides of a gap after segmenting of the bus bar 12 occurs.

Although the low energy detonator 18 is of known construction, both the response time and the trigger level of the preferred detonator are significantly lower than those of more commonly used commercially available high energy detonators. The preferred detonator has an "all fire" response time of 10 microseconds when subjected to current produced by discharge of a 0.4 microfarad capacitor charged to 50 volts. The energy input required to ensure detonation under standard conditions is about 0.0005 joules. For purposes of comparison, more commonly used high energy detonators may require about 0.003 joules for detonation.

The above-described interrupter provides reliable current-limited interruption of high voltage alternating current in the 200A–1000A range when connected in parallel with a current limiting fuse, and has a relatively low let-through current. For example, the let-through current for the 600 ampere interrupter described above should be about 14,000 amperes for a prospective fault current of 25,000 amperes(rms.sym).

To enable more precise control of the trigger level of the interrupter 10, the interrupter may include control means 20 as illustrated in FIG. 4. The control means 20 preferably includes a device which provides a voltage drop or voltage threshold in series with the detonator.

Figure 5:
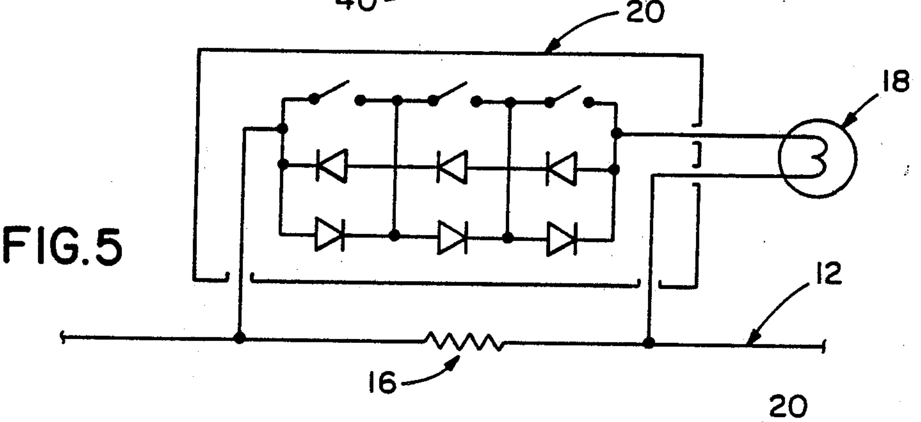
FIGS. 5–10 are schematic diagrams illustrating six different control circuits in accordance with six respective embodiments of the invention.

Referring particularly to FIG. 5, the control means 20 shown therein comprises two series of diodes connected in series with the detonator, in parallel with one another and in opposite directions. The diodes as shown provide a voltage drop or threshold in series with the detonator to raise the trigger level of the interrupter. Two parallel series of opposite polarity are provided so that the trigger level of the interrupter will not according to the instantaneous direction of the A.C. current. Switches are provided to enable current to bypass one or more of the diodes in each series so as to provide stepwise variability of the sensitivity of the interrupter. Because the switches enable external adjustment of the control unit identical control units can be used for interrupters having various trigger levels, and selection of the trigger level of a particular interrupter can be made in the factory simply by setting of the switches to appropriate positions.

Figure 7:
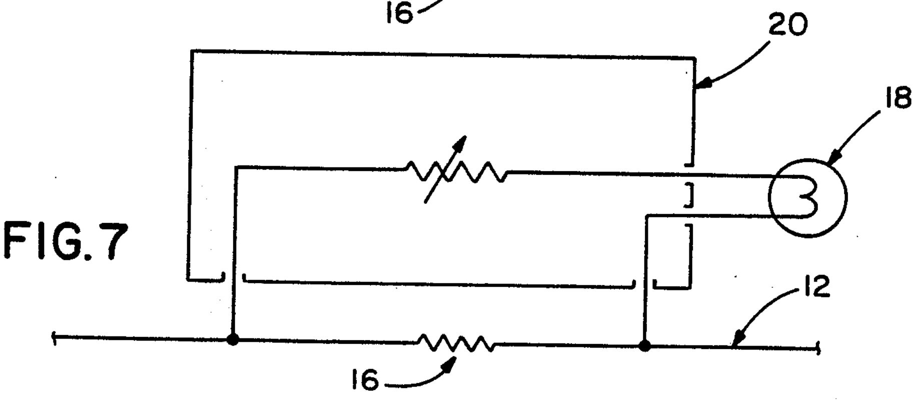
Figure 10:
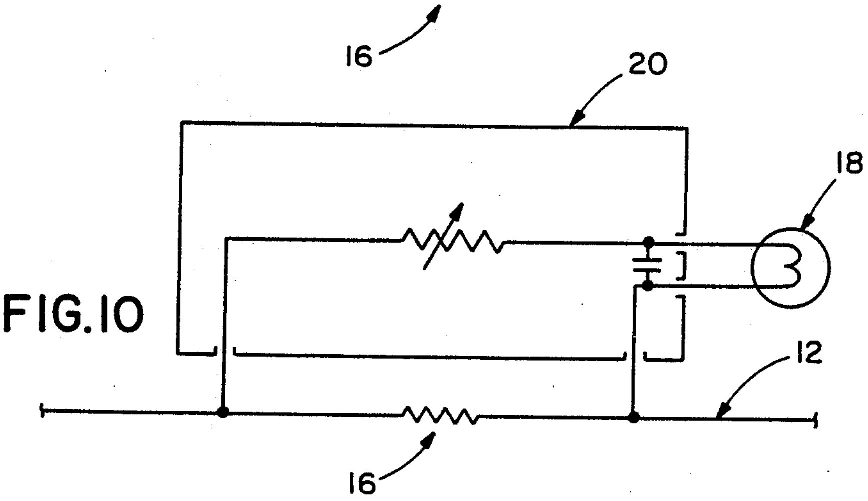

To enable continuous rather than stepwise adjustment of the trigger level of the interrupter, variable resistors are provided in the embodiments of FIGS. 7 and 10 in series with the detonator 18. The variable resistors provide a continuously variable voltage drop in series with the detonator. To prevent unintended triggering of the detonator due to power surges of very short duration, a capacitor may be connected in parallel with the detonator as shown in FIG. 10.

Figure 6:
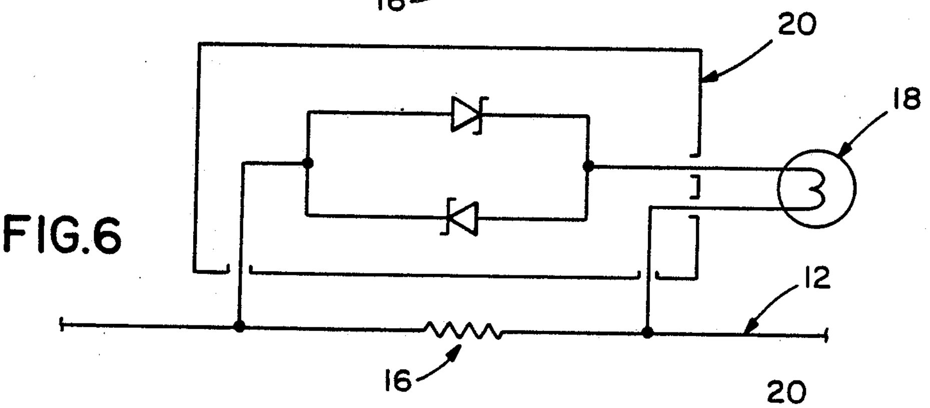
Figure 8:
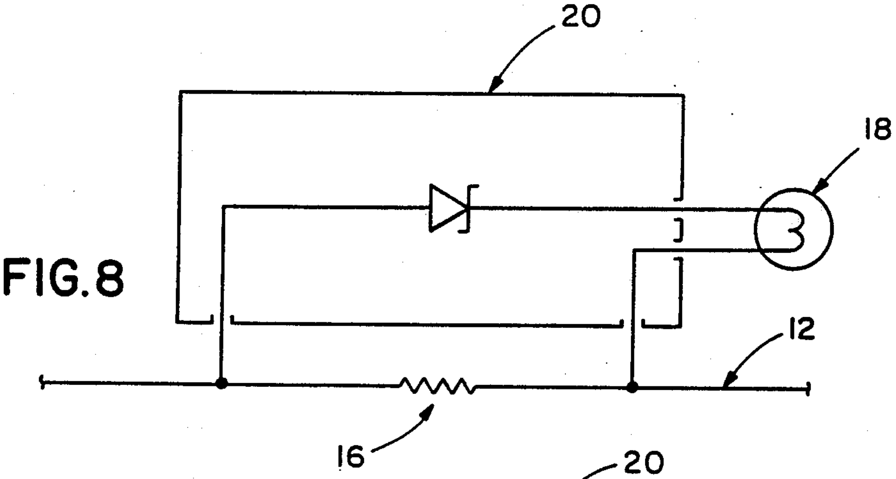
Figure 9:
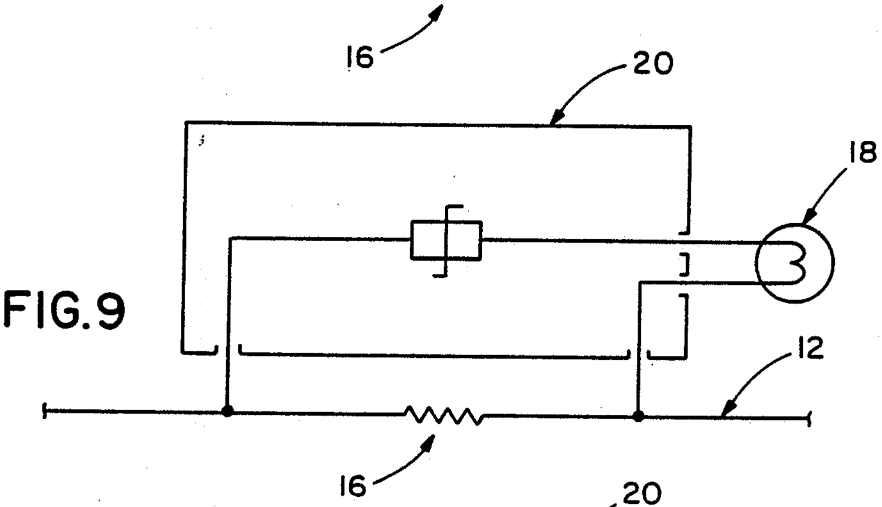

FIGS. 6, 8 and 9 illustrate control means 20 which are not externally adjustable. In these embodiments of the invention, the trigger level of the interrupter is selected simply by selection of appropriate components for the control unit 20 rather than by manipulation of a control. FIG. 6 illustrates a control unit 20 wherein a pair of zener diodes are arranged in parallel with one another and in series with the detonator, and oriented in opposite directions. As in the control means of FIG. 5, the orientation of the diodes in parallel and in opposite directions enables the control means to provide a threshold-type trigger level for the interrupter which is not dependent on the instantaneous direction of the AC current. The control means of FIG. 9 employs a metal oxide varistor (MOV) which has relatively high resistance when subjected to relatively low voltage in either direction, and has significantly lower resistance when subjected to higher voltage in either direction. As in the previously described control means of FIGS. 5–7 and 10, the control means of FIG. 9 is independent of the instantaneous AC current direction.

It may be desirable in some applications to provide an interrupter having a trigger level which differs depending upon the instantaneous current flow. For such an application, the device of FIG. 8 employing a single zener diode in series with the detonator may be suitable.

From the foregoing, it should be evident that the invention provides a novel and improved current interrupter. The invention is not limited to the particular embodiments described above or to any particular embodiments, but is defined by the following claims.

What is claimed is:

1. Apparatus for selectively interrupting electric current comprising:

elongation bus means;

explosive means for segmenting said bus means;

resistive means connected in series with said bus means;

detonator means in parallel with said resistive means to detonate said explosive means in response to current flow through said detonator means above a predetermined level resulting from current flow through said apparatus in excess of a predetermined trigger level; and adjustable control means to permit presetting of said trigger level;

said control means including a plurality of control elements having resistance which varies in response to voltage, and manually operable switch means for selectively shunting current around one or more of said control elements to provide stepwise adjustment of the sensitivity of the apparatus.

2. Apparatus in accordance with claim 1 wherein said resistive means has a predetermined melting point and carries normal load current continuously during normal operation at a temperature below said predetermined melting point, said resistive means and control means having characteristics such that in response to a fault current through said bus means, the detonator is actuated to detonate said explosive means without requiring the temperature of the resistive means to exceed its melting point;

said detonator having a detonation threshold of less than about 0.003 joules.

3. Apparatus for conducting electric current and selectively interrupting the flow of current through said apparatus, said apparatus being operative to interrupt said current when said current exceeds a predetermined trigger level, said apparatus comprising:

elongated bus means for conducting current under normal conditions;

explosive means for segmenting said bus means to interrupt said current when said trigger level is exceeded; and means for sensing excess current and detonating said explosive means in response thereto, comprising:

detonator means and control means connected in series with one another; and resistive means connected in parallel with said detonator means and said control means;

the parallel connection of said resistive means with said detonator means and control means being in series with said bus means;

said detonator means being operative to detonate said explosive means in response to current flow through said detonator means above a predetermined level resulting from current flow through said apparatus in excess of said trigger level;

said control means providing a voltage drop in series with said detonator to thereby establish the trigger level of the apparatus.

4. Apparatus in accordance with claim 3 wherein said control means comprises a resistor.

5. Apparatus in accordance with claim 3 wherein said control means comprises a variable resistor.

6. Apparatus in accordance with claim 3 wherein said control means comprises a plurality of control elements having resistance which varies in response to voltage, and manually operable switch means for selectively shunting current around one or more of said control elements to provide step-wise adjustment of sensitivity of the apparatus.

7. Apparatus in accordance with claim 3 wherein said control means comprises at least one control element having resistance which varies in response to the voltage.

* * * * *

UNITED STATES PATENT AND TRADEMARK OFFICE
CERTIFICATE OF CORRECTION

PATENT NO. : 4,920,446

DATED : April 24, 1990

INVENTOR(S) : Herbert M. Pflanz

It is certified that error appears in the above-identified patent and that said Letters Patent is hereby corrected as shown below:

Column 3, line 26, change "respectives" to --respective--.

Column 4, line 59, change "(rms.sym)." to --(rms, sym.)--.

Column 5, line 4, before "according" insert --vary--.

Column 5, line 58, change "elongation" to --elongated--.

Signed and Sealed this

First Day of October, 1991

*Attest:*

HARRY F. MANBECK, JR.

*Attesting Officer*

*Commissioner of Patents and Trademarks*